(12) United States Patent
Kuo et al.

(10) Patent No.: US 7,904,688 B1
(45) Date of Patent: Mar. 8, 2011

(54) MEMORY MANAGEMENT UNIT FOR FIELD PROGRAMMABLE GATE ARRAY BOARDS

(75) Inventors: Kuo-Sheng Kuo, Taipei (TW);
Kai-Chau Yang, Taipei (TW);
Yen-Tsung Chia, Taipei (TW)

(73) Assignee: Trend Micro Inc, Tokyo (JP)

( * ) Notice: Subject to any disclaimer, the term of this patent is extended or adjusted under 35 U.S.C. 154(b) by 836 days.

(21) Appl. No.: 11/316,022

(22) Filed: Dec. 21, 2005

(51) Int. Cl.
*G06F 12/00* (2006.01)
*G06F 13/00* (2006.01)
*G06F 13/28* (2006.01)
*H03K 17/693* (2006.01)

(52) U.S. Cl. ............... 711/170; 711/154; 711/E12.006; 711/E12.007; 716/16

(58) Field of Classification Search .................. None
See application file for complete search history.

(56) References Cited

U.S. PATENT DOCUMENTS

| | | | | |
|---|---|---|---|---|
| 5,692,147 | A * | 11/1997 | Larsen et al. | 711/202 |
| 6,078,736 | A * | 6/2000 | Guccione | 716/16 |
| 6,938,177 | B1 * | 8/2005 | Blemel | 713/500 |
| 7,454,550 | B2 * | 11/2008 | Benbow et al. | 710/306 |
| 2003/0086300 | A1 * | 5/2003 | Noyes et al. | 365/189.01 |
| 2004/0093537 | A1 * | 5/2004 | Thompson et al. | 714/38 |

OTHER PUBLICATIONS

"Developing and Integrating FPGA Coprocessors", Paul Ekas and Brian Jentz, Fall 2003, Altera Corporation, p. 1-6.*
"FPGA Peripheral Expansion & FPGA Co-Processing", Altera Corporation, Jul. 2004, p. 1-26.*
"The Authoritative Dictionary of IEEE Standards Terms", seventh edition, Dec. 2000, copyright by the IEEE p. 626.*

* cited by examiner

*Primary Examiner* — Pierre-Michel Bataille
*Assistant Examiner* — Michael Alsip
(74) *Attorney, Agent, or Firm* — IP Strategy Group, P.C.

(57) ABSTRACT

The invention relates to methods and apparatus for offloading the workload from a computer system's CPU, memory and/or memory controller. Methods and apparatus for managing board memory on a FPGA board on behalf of applications executing in one or more FPGAs are disclosed.

20 Claims, 4 Drawing Sheets

MEMORY MANAGEMENT UNIT FOR FIELD PROGRAMMABLE GATE ARRAY BOARDS

BACKGROUND OF THE INVENTION

Network communication has become ubiquitous in business and personal affairs alike. However, the massive volume of messages, emails, and files accessed and transmitted daily has proven to be fertile breeding grounds for malware, i.e., malicious data and code that can spread and cause damage to computer systems and data. Preventing the spread of malware and/or stopping malware from causing damage have been pressing issues for system administrators and users alike, For many computer systems, some type of scanning and/or content filtering arrangements have proven to be effective in reducing and/or eliminating the threat posed by malware. Scanning and/or content filtering have also been employed to implement data security policies and/or business policies with regarded to the information exchanged. By way of example, scanning and/or content filtering have been employed to limit reading and/or writing access to certain files, to route documents to appropriate destinations, etc.

Scanning and/or content filtering, while being highly effective, suffers one drawback. Unfortunately, scanning and/or filtering data consumes a large amount of processing and memory resources on the part of the system that performs such scanning and/or filtering. This is because scanning/filtering may employ highly sophisticated pattern recognition and other intelligent algorithms, most of which are highly resource intensive. If the computer system that performs such scanning and/or filtering is also employed to perform other tasks, the overall system performance across suffers. Yet, end-to-end security can be assured only if every computer in the communication path is afforded protection via scanning and/or filtering.

Even if faster processors are employed, the operating system remains a bottleneck for performance since all computing tasks, including the scanning and/or filtering of data, are handled by the operating system. Scanning/filtering may be performed on separate logic, using for example a FPGA board (Field Programmable Gate Array board) to offload the computing tasks from the CPU. However, the multiple computing tasks executed on the CPU and the FPGAs still all access the system memory (e.g., DRAM memory) through the system's memory controller. If the system's memory controller is performing memory accesses for scanning/filtering tasks, the memory controller defers servicing memory access requests from other tasks. Accordingly, performance still suffers even if the CPU is, not overburdened with scanning/filtering tasks.

In view of the foregoing, there are desired improved systems and methods for managing memory accesses on a FPGA board, which allows tasks to be offloaded from the system's CPU and results in improved system performance.

SUMMARY OF INVENTION

The invention relates, in an embodiment, to methods and apparatus for offloading the workload from a computer system's CPU, memory and/or memory controller. In an embodiment, the invention relates to a method for managing board memory in a logic board configured to be plugged into a backplane of a computer system. The logic board has a data bus for communicating with a processor of the computer system, a field-programmable gate array (FPGA) block having a set of FPGA ICs. The FPGA block is communicably coupled with the data bus. The board memory is configured to support application program execution of at least one application program by the set of FPGA ICs using a memory management unit (MMU) operatively coupled to the FPGA block and the board memory. For example, an application program may be executed by a FPGA IC of the FPGA board. Multiple applications may be executed by a FPGA IC or may be distributed among the multiple FPGA ICs of the FPGA board, The method includes initializing the memory board by writing into a pointer address portion for each of a plurality of memory chunks that are logically divided from at least a portion of the board memory an address value that reflects an address of a memory chunk that is immediately downstream of the each of the plurality of memory chunks if the plurality of memory chunks are logically tracked as a first linked list upon the initialization. The method further includes tracking the first linked list using a first head pointer that points to a head of the first linked list. The method additionally includes allocating, responsive to an allocation request by the MMU, a first memory chunk from the first linked list, the first memory chunk being at the head of the first linked list prior to the allocating, the allocating further causing the first head pointer to point at a second memory chunk that is immediately downstream of the first memory chunk.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
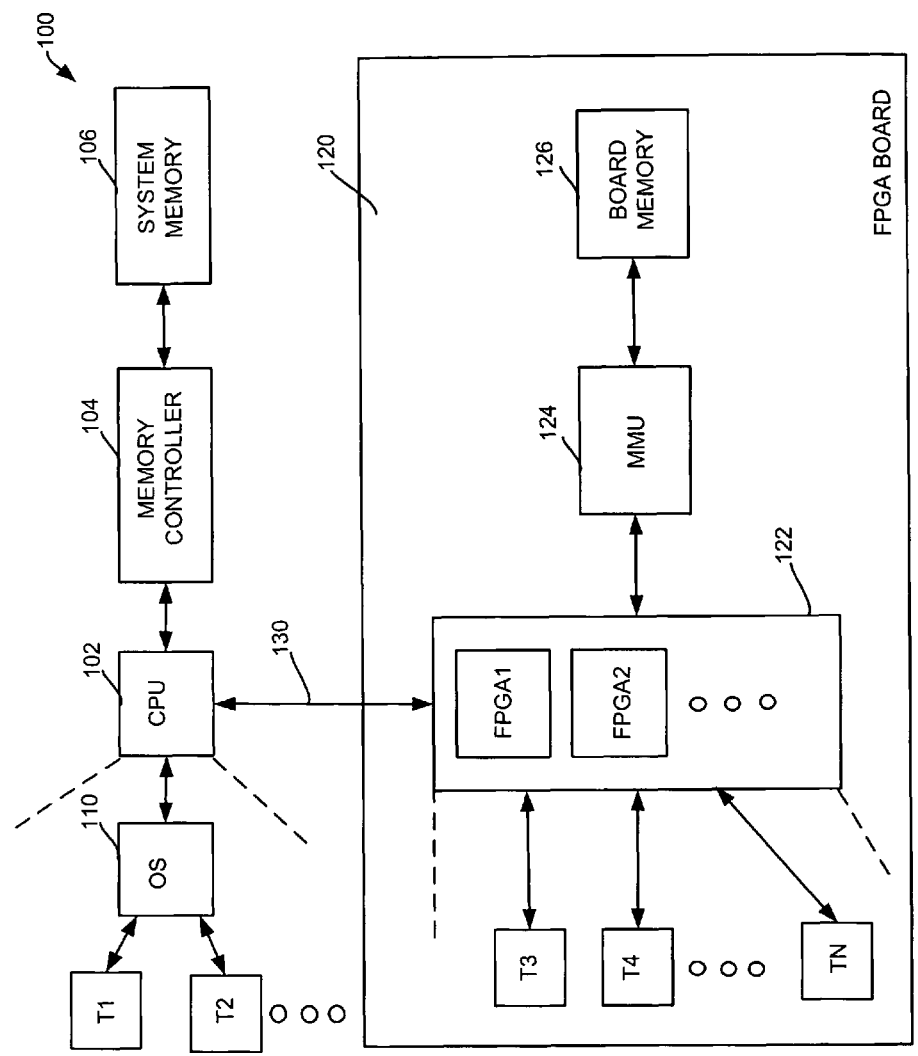
FIG. 1 shows, in accordance with an embodiment of the invention, a computer system having a CPU, a memory controller, and system memory, as well as a FPGA board coupled therewith.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, there are provided systems and methods for more efficiently offloading the processing and memory access loads from the computer system's CPU, memory controller, and system memory. In an embodiment, separate memory and memory management units are provided on a FPGA board to enable the FPGA board, which may employ multiple FPGAs, to offload tasks from the CPU, the system's memory controller, and the system's memory. As discussed previously, scanning/filtering represent prime candidates of tasks that can be offloaded onto a FPGA board.

By providing the FPGA with its own separate memory instead of relying on the system memory for storing data/instructions, the performance bottleneck discussed earlier is obviated. However, the FPGA board now needs to track its own memory usage, and more particularly, needs to handle the memory allocation tasks and memory deallocation tasks on behalf of the FPGA.

In an embodiment, the memory provided on the FPGA board (referred to herein as board memory to distinguish from the nominal amount of memory typically provided with prior art FPGA boards) is divided into chunks. In some embodiments, dynamic random access memory (DRAM) and more particularly, double data rate (DDR) DRAM is employed to fulfill the memory requirement for tasks executing on the FPGA. The size of the memory chunks may be defined based on the purpose of the FPGA board and may also depend on the DDR access behavior.

To support dynamic allocation and deallocation of memory, two lists (L1 and L2) are employed to track the chunks. Initially, all free chunks are tracked using a single list L1. As chunks are allocated to a task, they are taken off the head of list L1. The allocation may employ, for example, the memory allocation command or malloc( ). The allocated chunks may then be employed by the requesting task to perform, for example, scanning and/or filtering.

After the task terminates, the allocated chunks are deallocated using, for example, the memory deallocation command or free( ). When deallocated, the previously allocated chunks are now tracked by list L2. Thus, as memory is allocated and deallocated, list L1 is diminished and list L2 grows. At some point in time, list L1 is completely depleted. At that point, list L1 and L2 may swap so the deallocated memory of list L2 may now be used to satisfy memory allocation requests. On the other hand, the now-empty L2 list (after the swap) may begin to fill with deallocated memory again. By using two lists to track the board memory, efficient memory allocation and deallocation is accomplished.

The features and advantages of the invention may be better understood with reference to drawings and discussions that follow. FIG. 1 shows, in accordance with an embodiment of the invention, a computer system 100 having a CPU 102 (such as a Pentium™-class processor), a memory controller 104, and system memory 106, which may be DRAM. Executing on CPU 102 are operating system 110 and a plurality of example tasks T1 and T2. The operation of CPU 102, memory controller 104, system memory 106 to support the execution of operating system 100 and tasks T1 and T2 are conventional.

There is also shown a FPGA board 120, representing the FPGA board employed to offload tasks from CPU102, system memory controller 104, and system memory 106. FPGA board may represent, for example, a board configured to be plugged into the back plane of computer system 100. Unlike prior art FPGA boards, FPGA board 120 has its own board memory 126, which may be substantial and may range from 256 Megabytes of memory up to multiple gigabytes of memory, for example. Note that board memory, as the term is employed herein, refers to memory sufficient to support the execution needs of the tasks executing on the FPGAs without having to resort to main system memory. A memory management unit (MMU) 124 is provided to manage board memory 126 on behalf of FPGA board 120.

FPGA board 120 is shown including a FPGA block 122, which in turn includes a set of FPGA ICs, e.g., FPGA1, FPGA2, etc. The number of FPGAs provided on FPGA board 120 may vary depending on the workload to be offloaded from CPU 102. A plurality of tasks T3-TN are shown executing on the FPGAs of FPGA board 120.

FPGA board 120 communicates with the OS kernel in OS 110 via a path 130 (conceptually shown in FIG. 1). Path 130 may represent a communication bus and may be employed to, for example, exchange files to be scanned/filtered, the scanning/filtering result, hand-shaking signals, etc.

Since FPGA board 120 has its own DRAM memory 126 and its own MMU 124, FPGA board 120 not only offloads the processing load from CPU 102 (by handling the computing load for tasks T3-TN in the example of FIG. 1) but also offloads the memory management load from system memory control 104 and system memory 106. Tasks T3-TN no longer has to employ system memory manager 104 and system memory 106 to perform its scanning/filtering tasks. In an embodiment, system memory 106 and board memory 126 are separate physical memory blocks and are not sharable (i.e., CPU 102 cannot use board memory 126 for task execution and contrarily, the FPGAs cannot use main system memory 106 to support its task execution. By keeping the board memory separate from the system memory, FPGA board 120 may be installed and removed from system 100 on a plug-and-play basis, permitting different FPGA boards having different capabilities to be added to and/or removed from system 100 easily.

Although FIG. 1 shows only one MMU 124 and a board memory 126, multiple MMUs may be coupled to the FPGA block, with each MMU being coupled to its own board memory block for managing that board memory block on the FPGA board. An arbitrator circuit coupled with the FPGA block and the MMUs may arbitrate which application executed via the FPGA block would be assigned to which set of MMU/board memory block. This assignment may take into account, for example, the amount of allocable memory available in a given board memory block and/or the respective loads on the board memory blocks.

Figure 2:
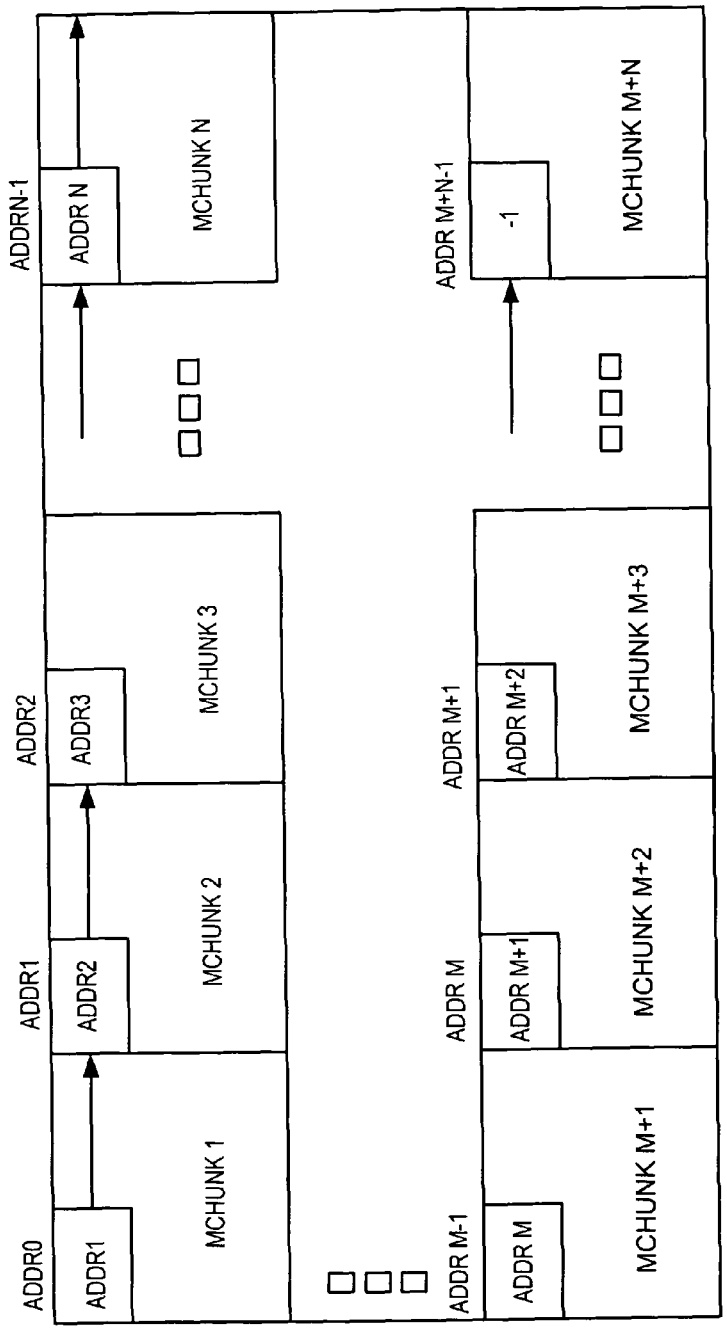
FIG. 2 shows, in accordance with an embodiment of the invention, the memory organization of board memory on the FPGA board.

FIG. 2 shows, in accordance with an embodiment of the invention, the memory organization of board memory 126. As mentioned, board memory 126 may be divided into a plurality of memory chunks as conceptually shown. Each memory chunk may be thought of as an atomic memory unit when requested by the application task. The sizing of the chunk (e.g., 64 bytes, 128 bytes, 256 bytes, etc.) is configurable and is determined based on the need of the tasks executing on FPGA board 120, the data path width, the DDR timing, etc. In an embodiment, each memory chunk represents 128 bytes of memory for a DDR that operates at 266 MHz.

Each memory chunk includes a content portion for storing information and a pointer address portion for storing the address of the next chunk. A pointer points to the address stored in the pointer address portion. Thus, as can be seen in the example of FIG. 2 which represents the view of board memory 126 after initialization, memory chunk mchunk 1 has an address Addr 0 and a pointer that points to the next memory chunk mchunk 2, which has address Addr 1. Since memory chunk mchunk 1 points to mchunk 2, the content of that pointer is "Addr 1", indicating that the pointer of mchunk 1 is pointing to the memory chunk at address Addr 1, i.e., mchunk 2.

As another example, memory chunk mchunk m+2 has an address Addr m and a pointer that points to the next memory chunk mchunk m+3, which has address Addr m+1. Since memory chunk mchunk m+2 points to mchunk m+3, the content of that pointer is "Addr m+1", indicating that the pointer of mchunk m+2 is pointing to the memory chunk at address Addr m+1, i.e., mchunk m+3.

The layout of the board memory, along with the programming of the value for the pointer in each memory chunk so that the pointer points at the next chunk, is performed by the initialization procedure. The initialization procedure further places the address of the first available chunk (e.g., Addr 0 in the example of FIG. 2) into the register in the MMU, thereby allowing the MMU to begin the allocation of memory chunks upon request.

Figure 4:
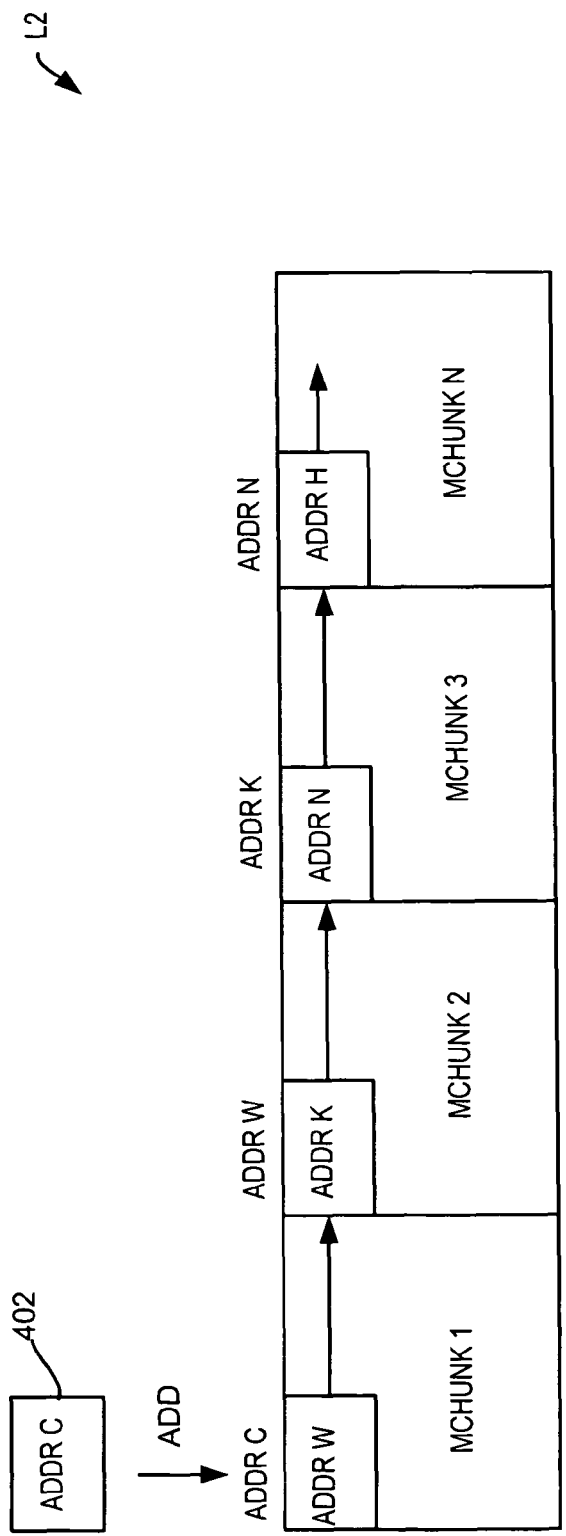
FIG. 4 shows, in accordance with an embodiment of the invention, list L2, representing a structure for tracking a collection of deallocated memory chunks.

As can be appreciated from FIG. 2, after board memory 126 is initialized (e.g., at power up), the memory chunks of board memory 126 may be thought of as a linked list. By providing a list_head pointer that points to the head of the list (as seen in FIG. 4), the memory chunks of board memory 126 may be tracked.

Figure 3:
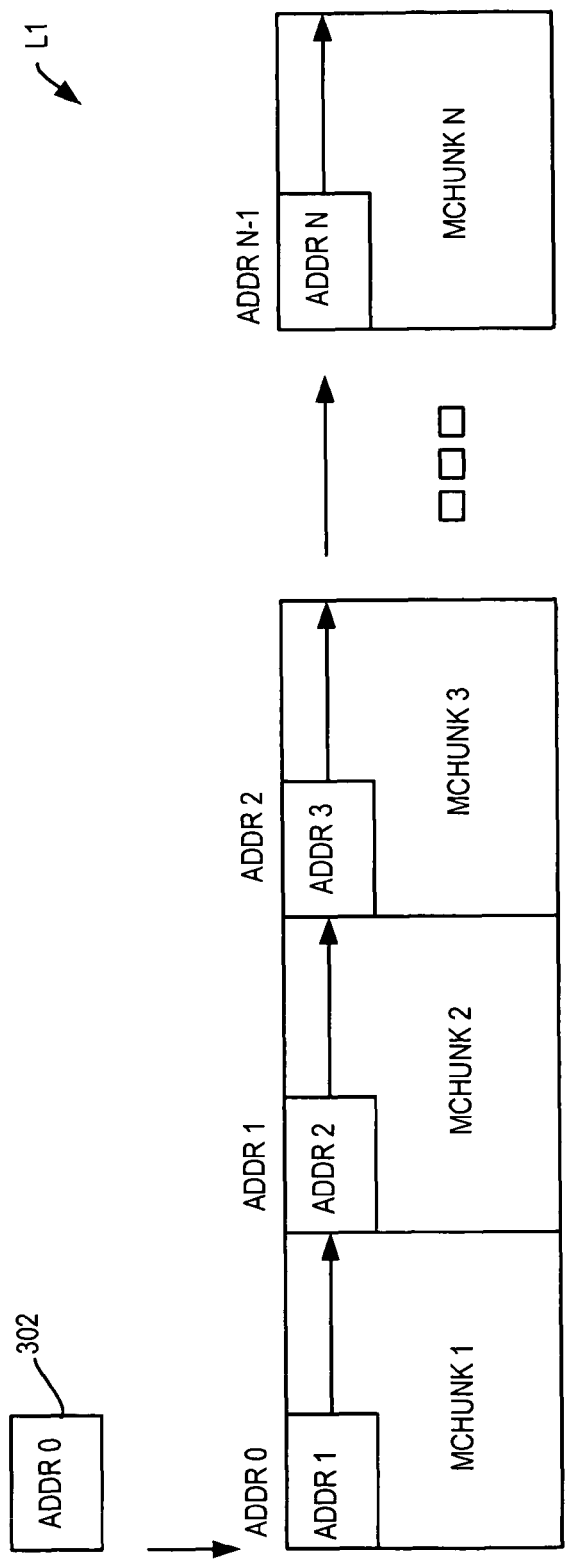
FIG. 3 shows, in accordance with an embodiment of the invention, list L1, representing a structure for tracking a collection of memory chunks available for allocation.

As tasks begin to issue memory allocation requests via the MMU, memory chunks are removed from the list of free memory. Each memory allocation request results in a memory chunk being allocated. If a task requires multiple memory chunks, the task may issue multiple allocation requests to the MMU. As memory chunks are removed, the list_head pointer (302 in FIG. 3) moves downward. Generally speaking, list_head pointer 302 points to the next available chunk for allocation at a given time. Further, the register in the MMU is updated to contain the address of the next available memory chunk.

As memory chunks are deallocated (e.g., due to task termination), memory chunks are returned to another list L2. FIG. 4 shows list L2, represent an example of a collection of memory chunks deallocated. List L2 is tracked by a list_head pointer 402, which is different from list_head pointer 302 of FIG. 3. In this case, as a memory chunk is deallocated, that memory chunk is inserted at the head of list L2 and the address portion of the newly deallocated memory chunk is configured such that it points to the memory chunk that is previously at the head of the list. Further, the list_head pointer 402 moves to point at the newly inserted memory chunk (now at the head of the list). The count of list L2 is updated to reflect the number of memory chunks currently tracked by list L2.

At some point, list L1 is depleted due to the repeated allocations of memory chunks. At this point, a swap procedure is employed by the MMU to swap list L1 and list L2. In other words, immediately after swapping, the new list L2 is empty, and the new list L1 contains a list of memory chunks previously deallocated. This new list L1 is then used to satisfy future allocation requests, wherein the new list L2 is now used to track future deallocated memory chunks.

It is preferable that the behavior of memory allocation and memory deallocation is substantially "symmetric." In other words, it is preferable that, on average, the number of memory chunks allocated is roughly equal to the number of memory chunks deallocated over time. This prevents an out-of-memory situation where memory chunks are all allocated and none is available for allocating when requested by an application (via the MMU). To prevent transient surges in memory demand from using up all allocable memory chunks, the system designer may choose to increase the amount of board memory.

As can be appreciated from the foregoing, embodiments of the invention advantageously offloads the processing and memory management load from the system CPU, memory controller, and system memory using a FPGA board that has its own board memory and board MMU. By partitioning the DDR board memory into memory chunks having pointer capabilities, the board memory may be efficiently tracked during allocation and deallocation using two linked lists.

Although only a single MMU is shown in FIG. 1, multiple MMUs may be provided on the FPGA board. For example, board memory 126 may be divided into multiple memory portions, with each portion being managed by its own MMU. A given FPGA may be hardwired to a given MMU, or the multiple FPGAs may share a set of MMUs, with an arbitration circuit deciding on a dynamic basis which FPGA is assigned to which MMU based on factors such as processing load, memory sizing, etc. Additionally, the MMU may employ two arrays or more arrays to hold several addresses of memory chunks. In this manner, DDR I/O's requests may be reduced. Also, the term "set" refers to a collection of items having a one item or a set may have multiple items.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A logic board configured to be plugged into a backplane of a computer system, said logic board comprising:
   a board;
   a field-programmable gate array (FPGA) block disposed on said board and having a set of FPGA ICs;
   board memory disposed on said board and supporting application program execution of at least one application program by said set of FPGA ICs;
   memory management unit (MMU) disposed on said board, said MMU being operatively coupled to said FPGA block and said board memory, said MMU managing memory in said board memory;
   a first list tracking a first free memory chunk set, said first free memory chunk set including free memory chunks in said board memory;
   logic removing allocated memory chunks from said first free memory chunk set when said allocated memory chunks are allocated to a task, said allocated memory chucks being memory chunks of said first free memory chunk set that are allocated to said task;
   logic deallocating said allocated memory chunks such that said allocated memory chunks become deallocated memory chunks after said task has terminated;

a second list tracking a first deallocated memory chunk set, said first deallocated memory chunk set including said deallocated memory chunks;

logic determining that said first list has become empty; and logic swapping a tracking activity of said first list and a tracking activity of said second list when said first list has become empty, said second list becoming empty immediately after said swapping, wherein said first list tracks a second free memory chunk set after said swapping, said second free memory chunk set including said deallocated memory chunks, and said second list tracks a second deallocated memory chunk set after said swapping.

2. The logic board of claim 1 wherein said MMU is configured to handle memory allocation tasks on behalf of said at least one application program.

3. The logic board of claim 2 wherein said MMU is configured to handle memory deallocation tasks on behalf of said at least one application program.

4. The logic board of claim 1 wherein said board memory is not sharable by said processor of said computer system for supporting application program execution by said processor.

5. The logic board of claim 1 wherein said board memory includes a plurality of memory chunks logically divided from at least a portion of said board memory, each of said plurality of memory chunks includes a content portion and a pointer address portion.

6. The logic board of claim 5 wherein said plurality of memory chunks are configured as a linked list upon initialization, a pointer address portion of a given memory chunk of said plurality of memory chunks stores an address of a next memory chunk of said plurality of memory chunks to signify that said given memory chunks points to said next memory chunk in said linked list.

7. The logic board of claim 1 further comprising logic for ensuring that, on average, the number of all allocated memory chunks in said board memory is equal to the number of all deallocated memory chunks in said board memory over time.

8. The logic board of claim 1 wherein said MMU includes a register configured for storing an address of the next-to-be-allocated memory chunk.

9. A method for managing board memory in a logic board configured to be plugged into a backplane of a computer system, said logic board communicating with a processor of said computer system, said logic board including a field-programmable gate array (FPGA) block having a set of FPGA ICs, said FPGA block being communicably coupled with said computer system; said board memory being configured to support application program execution of at least one application program by said set of FPGA ICs using a memory management unit (MMU) operatively coupled to said FPGA block and said board memory, said method comprising:

initializing said board memory by writing into a pointer address portion for each of a plurality of memory chunks that are logically divided from at least a portion of said board memory an address value that reflects an address of a memory chunk that is immediately downstream of said each of said plurality of memory chunks;

using a first list to track a first free memory chunk set, said first free memory chunk set including free memory chunks in said board memory;

removing allocated memory chunks from said first free memory chunk set when said allocated memory chunks are allocated to a task, said allocated memory chucks being memory chunks of said first free memory chunk set that are allocated to said task;

deallocating said allocated memory chunks such that said allocated memory chunks become deallocated memory chunks after said task has terminated;

using a second list to track a first deallocated memory chunk set, said first deallocated memory chunk set including said deallocated memory chunks;

determining that said first list has become empty;

swapping a tracking activity of said first list and a tracking activity of said second list when said first list has become empty, said second list becoming empty immediately after said swapping;

using said first list to track a second free memory chunk set after said swapping, said second free memory chunk set including said deallocated memory chunks; and using said second list to track a second deallocated memory chunk set after said swapping.

10. The method of claim 9 further comprising ensuring that, on average, the number of all allocated memory chunks in said board memory is equal to the number of all deallocated memory chunks in said board memory over time.

11. The method of claim 9 wherein said board memory is not sharable by said processor of said computer system for supporting application program execution by said processor.

12. The method of claim 9 wherein each of said plurality of memory'chunks includes, in addition to said pointer address portion, a content portion for storing information.

13. The method of claim 9 further including loading into a register of said MMU an address of a next-to-be-allocated memory chunk in advance of an allocation request that results in the allocation of said next-to-be-allocated memory chunk.

14. The method of claim 9 further including loading into a register of said MMU addresses of a plurality of next-to-be-allocated memory chunks in advance of an allocation request that results in the allocation of one of said plurality of next-to-be-allocated memory chunks.

15. A logic board configured to be plugged into a backplane of a computer system, said logic board comprising:

a board;

a field-programmable gate array (FPGA) block disposed on said board and having a set of FPGA ICs;

a plurality of board memory blocks disposed on said board and supporting application program execution of a plurality of application programs by said set of FPGA ICs, said plurality of board memory blocks including at least a dynamic random access memory (DRAM) disposed on said board;

at least one memory management unit (MMU) disposed on said board, said at least one MMU being operatively coupled to said FPGA block and said plurality of board memory blocks, said at least one MMU managing memory in said plurality of board memory blocks;

a first list tracking a first free memory chunk set, said first free memory chunk set including free memory chunks in said plurality of board memory blocks;

logic removing allocated memory chunks from said first free memory chunk set when said allocated memory chunks are allocated to a task, said allocated memory chucks being memory chunks of said first free memory chunk set that are allocated to said task;

logic deallocating said allocated memory chunks such that said allocated memory chunks become deallocated memory chunks after said task has terminated;

a second list tracking a first deallocated memory chunk set, said first deallocated memory chunk set including said deallocated memory chunks;

logic determining that said first list has become empty; and logic swapping a tracking activity of said first list and a tracking activity of said second list when said first list has become empty, said second list becoming empty immediately after said swapping, wherein said first list tracks a second free memory chunk set after said swapping, said second free memory chunk set including said deallocated memory chunks, and said second list tracks a second deallocated memory chunk set after said swapping.

16. The logic board of claim 15 wherein each of said plurality of MMUs is configured to handle memory allocation tasks on behalf of said at least one application program of said plurality of application programs in a board memory block operatively coupled to said each of said plurality of MMUs.

17. The logic board of claim 15 wherein each of said plurality of MMUs is configured to handle memory deallocation tasks on behalf of said at least one application program of said plurality of application programs in a board memory block operatively coupled to said each of said plurality of MMUs.

18. The logic board of claim 15 wherein said plurality of board memory blocks are not sharable by said processor of said computer system for supporting application program execution by said processor.

19. The logic board of claim 15 further comprising logic for ensuring that, on average, the number of all allocated memory chunks in said plurality of board memory blocks is equal to the number of all deallocated memory chunks in said plurality of board memory blocks over time.

20. The logic board of claim 15 wherein said at least one application program of said plurality of application programs includes code for scanning a file.

* * * * *